United States Patent [19]

Shimizu et al.

[11] Patent Number: 4,612,354
[45] Date of Patent: Sep. 16, 1986

[54] METHOD FOR PREVENTING POLYMER SCALE DEPOSITION IN THE POLYMERIZATION OF A VINYLIC MONOMER

[75] Inventors: Toshihide Shimizu, Urayasu; Yasuo Furukawa, Joetsu; Ichiro Kaneko, Ibaraki, all of Japan

[73] Assignee: Shin-Etsu Chemical Co., Ltd., Japan

[21] Appl. No.: 764,508

[22] PCT Filed: Oct. 14, 1982

[86] PCT No.: PCT/JP82/00414
§ 371 Date: Jun. 14, 1983
§ 102(e) Date: Jun. 14, 1983

[87] PCT Pub. No.: WO83/01452
PCT Pub. Date: Apr. 28, 1983

Related U.S. Application Data

[63] Continuation of Ser. No. 514,810, Jun. 14, 1983, abandoned.

[30] Foreign Application Priority Data

Oct. 20, 1981 [JP] Japan ............................... 56-167699

[51] Int. Cl.$^4$ ................................................ C08F 2/00
[52] U.S. Cl. .................................................... 526/62
[58] Field of Search ......................................... 526/62

[56] References Cited

U.S. PATENT DOCUMENTS

| | | | |
|---|---|---|---|
| 3,669,946 | 6/1972 | Koyanagi et al. | 526/62 |
| 4,098,972 | 7/1978 | Ogawa et al. | 526/62 |
| 4,142,033 | 2/1979 | Witenhafer | 526/62 |
| 4,173,696 | 11/1979 | Koyanagi et al. | 526/62 |
| 4,256,864 | 3/1981 | Cohen | 526/62 |

*Primary Examiner*—Paul R. Michl
*Attorney, Agent, or Firm*—Hopgood, Calimafde, Kalil, Blaustein & Judlowe

[57] ABSTRACT

The invention provides a novel and efficient method for preventing deposition of polymer scale on the reactor walls more or less unavoidable in the course of polymerization of a vinylic monomer or, in particular, in the suspension polymerization of vinyl chloride. The method comprises, prior to polymerization, coating the reactor walls with an aqueous coating solution containing (a) an alkali metal or ammonium salt of a sulfonic acid-type or carboxylic acid-type dye or an organic sulfonic or carboxylic acid having at least one pair of conjugated double bonds in a molecule and (b) a polyvinyl alcohol in a specified proportion, the pH value of the solution being controlled not to exceed 7, followed by drying. The method is so effective that the polymer scale deposition can be prevented in the suspension polymerization of vinyl chloride even when the polymerization initiator is an organic peroxide having a relatively high solubility in water whereas, in the prior art, a very large amount of polymer scale deposition was unavoidable to prohibit the use of such an initiator notwithstanding the excellent quality of the polyvinyl chloride resin product obtained therewith.

7 Claims, No Drawings

METHOD FOR PREVENTING POLYMER SCALE DEPOSITION IN THE POLYMERIZATION OF A VINYLIC MONOMER

This application is a continuation, of application Ser. No. 514,810, filed June 14, 1983, now abandoned.

BACKGROUND OF THE INVENTION

The present invention relates to a method for preventing polymer scale deposition on the reactor walls in the polymerization of a vinylic monomer such as vinyl chloride.

Vinylic monomers are polymerized in several types of polymerization procedures including suspesnion polymerization, emulsion polymerization, solution polymerization, gas-phase polymerization and bulk polymerization. One of the difficult problems common to all of these polymerization procedures in the prior art is the deposition of polymer scale on the reactor walls and the surfaces of other equipments such as the stirrer and the like coming into contact with the monomer under polymerization.

That is, when a vinylic monomer is polymerized in either one of the above mentioned polymerization procedures, the polymer is deposited more or less on the walls of the reactor and the surfaces of the stirrer and other equipments coming into contact with the monomer to form scale thereon so that various disadvantages are unavoidable such as the decrease in the yield of the desired polymer and lowered cooling capacity of the polymerization reactor as well as degraded quality of the polymer product due to the polymer scale eventually entering the polymer product as coming off the reactor walls. In addition, such polymer scale must be removed taking a great deal of time and labor in order to prepare the polymerization reactor for the next run of the polymerization. The scale removing works by man power present a very serious problem of safety against human body because the polymer scale usually contains a considerably large amount of the unreacted monomer absorbed therein which is sometimes toxic as is a matter of very serious concern in recent years as in the case of vinyl chloride in particular.

A number of methods have been proposed hitherto to prevent the polymer scale deposition on the reactor walls. Exemplary of such methods are a method in which the reactor walls and the surfaces of the stirrer and the like are coated, prior to the polymerization, with a polar organic compound such as amine compounds, quinone compounds, aldehyde compounds and the like or a dye or pigment (see, for example, Japanese Patent Publication Nos. 45-30343 and 45-30835), a method in which the walls and surfaces are coated with a polar organic compound or a dye having been treated with a metal salt (see Japanese Patent Publication No. 52-24953), a method in which the coating material is a mixture of an electron donor compound and an electron acceptor compound (see Japanese Patent Publication No. 53-28347) and a method in which the coating material is an inorganic salt or an inorganic complex compound (see Japanese Patent Publication No. 52-24070).

The above mentioned methods by coating are indeed effective in preventing polymer scale deposition on the thus coated surfaces when the polymerization initator used in the reaction is an azo compound or an organic peroxide having a long-chain alkyl group. The effect of preventing polymer scale deposition by these coating methods is greatly decreased or hardly obtained, for example, in the suspension polymerization of vinyl chloride in an aqueous polymerization medium in which the polymerization initiator is an organic peroxide which is soluble in the monomer but has a relatively large solubility in water of 0.2% by weight or larger at 20° C. In addition, effectiveness of such a coating method for polymer scale prevention can hardly be expected when the polymerization procedure is for the preparation of a polymer of styrene, copolymers of styrene and butadiene, copolymers of acrylonitrile, butadiene and styrene and the like.

Accordingly, whereas the use of an organic peroxide soluble in monomer but having a solubility in water of 0.2% by weight or larger at 20° C. as the polymerization initiator is highly desirable, in particular, in the suspension polymerization of vinyl chloride due to the superior quality of the polyvinyl chloride products in respects of little initial coloring of the polymer in the course of fabrication by molding and high heat stability of the shaped articles, such a polymerization initiator can hardly be put to practical use due to the difficulty in preventing the polymer scale deposition on the reactor walls. Therefore, it has been an important technical problem to be solved to establish an effective method for the polymer scale prevention even in the suspension polymerization of vinyl chloride using such an organic peroxide as mentioned above as the polymerization initiator.

SUMMARY OF THE INVENTION

It is therefore an object of the present invention to provide a novel and efficient method for preventing deposition of polymer scale on the reactor walls and other surfaces coming into contact with the monomer in the polymerization of a vinylic monomer.

Another object of the invention is to provide a novel and effective method for preventing deposition of polymer scale on the reactor walls and other surfaces in the suspension polymerization of vinyl chloride in which the polymerization initiator is an organic peroxide which is soluble in the monomer but has a solubility in water of 0.2% by weight or larger at 20° C.

The method of the present invention comprises, in the polymerization of a vinylic monomer in a polymerization reactor, the following steps of (A) coating the surface of the walls of the polymerization reactor, prior to the introduction of the polymerization mixture thereto, with an aqueous solution having a value of pH of 7 or below and containing
  (a) an alkali metal or ammonium salt of a sulfonic acid-type or carboxylic acid-type dye or an alkali metal or ammonium salt of an organic sulfonic acid or carboxylic acid having at least one pair of conjugated double bonds in a molecule, and
  (b) a polyvinyl alcohol, and
(B) drying the thus coated surface.

DETAILED DESCRIPTION OF THE PREFERRED EMBODIMENTS

It is known in the prior art that, when an aqueous coating solution is used in the coating method for the polymer scale prevention, no satisfactory effects can be obtained with a coating compound having a $\sigma$ electron or a $\pi$ electron in the molecular structure but somewhat better results are obtained with an organic compound having a pair of conjugated double bonds in the molecular structure as the coating compound. In particular, sulfonic acid-type or carboxylic acid-type dyes or organic sulfonic acids and carboxylic acids may expectedly be effective for the purpose. Unfortunately, these compounds are soluble in water only when they are in the form of an alkali metal salt or an ammonium salt to give an alkaline aqueous solution and the desired polymer scale preventing effect can hardly be obtained by coating the reactor walls with such an aqueous solution followed by drying.

Based on the above described facts, the inventors have conducted extensive investigations and arrived at a discovery that remarkably improved effects for the prevention of polymer scale deposition can be obtained by the coating method using an aqueous coating solution prepared by the neutralization or acidification of an aqueous solution containing the above mentioned alkali metal or ammonium salt of a sulfonic acid-type or carboxylic acid-type dye or organic sulfonic acid or carboxylic acid having at least one pair of conjugated double bonds in a molecule to have a pH of 7 or below and further admixed with a polyvinyl alcohol. The present invention has been completed on the base of this discovery.

In accordance with the above mentioned method of the present invention, unexpectedly remarkable effects are obtained for the prevention of polymer scale deposition on the reactor walls and the surfaces of other parts such as the stirrer blades and stirrer shaft and the like coming into contact with the monomer or monomers under polymerization. This effect of the inventive method is not limited to a specific type of the polymerization but effective in any types of polymerization including suspension polymerization, emulsion polymerization, bulk polymerization and the like. The effectiveness is not limited by the material of the reactor walls and other surfaces which may be stainless steel or glass lining. Furthermore, great advantages are obtained by the inventive method since the effectiveness of the method is little influenced by the type of the monomer or monomers, composition of the polymerization mixture, kind of the polymerization initiator and other factors. Therefore, those polymerization processes, which have been performed in the prior art by use of a glass-lined polymerization reactor in consideration of the less suspceptibility of the glass-lined reactors than stainless steel-made reactors to the polymer scale deposition, can easily be performed in a polymerization reactor made of stainless steel so that great industrial advantages are obtained also in this respect.

Limiting the subject matter to the suspension polymerization of vinyl chloride in an aqueous polymerization medium, the inventive method gives a possibility that suspension polymerization of vinyl chloride can be undertaken using an organic peroxide which is soluble in the monomer but has a relatively large solubility in water of at least 0.2% by weight at 20° C. as the polymerization initiator without or with little of the problem of polymer scale deposition on the reactor walls so that the thus obtained product of polyvinyl chloride product advantageously has a high quality not only in the absence of the initial coloring by molding and the excellent heat stability of the polymer but also in the remarkably decreased number of fish-eyes contained therein.

The method of the present invention is very versatile in its effect of very reliable polymer scale prevention in a wide variety of polymerization processes and the mechanism therefor is presumably as follows. That is, the coating compound, i.e. the salt form of the sulfonic acid-type or carboxylic acid-type dye or the organic sulfonic acid or carboxylic acid having at least one pair of conjugated double bonds in a molecule, dissolved in the aqueous coating solution is insolubilized on the reactor walls when the coating solutin is rendered neutral to acidic and applied to the reactor walls followed by drying so that the thus formed coating layer of the compound firmly adheres to the surface. In addition, the coating layer is strongly hydrophilic so that the adsorption of the monomer-soluble organic peroxide as the polymerization initiator dissolved to some extent in the aqueous polymerization mixture is effectively prevented and the coating compound in the coating layer is safe from removal from the reactor walls as a result of decomposition by the monomer-soluble organic peroxide as the polymerization initiator.

In the following, the method of the present invention is described in further detail.

The component (a) in the aqueous coating solution used in the inventive method is an alkali metal or ammonium salt of either (a-1) a sulfonic acid-type or carboxylic acid-type dye or (a-2) an uncolored or little colored organic sulfonic acid or carboxylic acid having at least one pair of conjugated double bonds in the molecular structure. The former class of the coating component, i.e. the salt of the specific dye, is exemplified by C.I. Direct Yellow 1, C.I. Acid Yellow 38, C.I. Acid Yellow 3, C.I. Reactive Yellow 3, C.I. Direct Orange 2, C.I. Direct Orange 10, C.I. Direct Red 18, C.I. Acid Red 52, C.I. Acid Red 73, C.I. Direct Red 186, C.I. Direct Red 92, C.I. Direct Violet 1, C.I. Direct Violet 22, C.I. Acid Red 18, C.I. Acid Violet 11, C.I. Acid Violet 78, C.I. Mordant Violet 5, C.I. Direct Blue 6, C.I. Direct Blue 71, C.I. Direct Blue 106, C.I. Reactive Blue 2, C.I. Reactive Blue 18, C.I. Acid Blue 116, C.I. Acid Blue 158, C.I. Mordant Blue 1, C.I. Mordant Black 1, C.I. Mordant Black 5, C.I. Acid Black 2, C.I. Direct Black 38, C.I. Solubilized Vat Black 1, C.I. Fluorescent Brightening Agent 30, C.I. Fluorescent Brigthening Agent 32, C.I. Azoic Brown 2 and the like.

The component (a-2), which is an alkali metal or ammonium salt of an uncolored or little colored organic sulfonic acid or carboxylic acid having at least one pair of conjugated double bonds in a molecule, is exemplified by 1-naphthalene sulfonic acid, anthraquinone sulfonic acids, metanilic acid, dodecylbenzene sulfonic acid, p-toluene sulfonic acid, abietic acid, isonicotinic acid, benzoic acid, phenyl glycine, 3-hydroxy-2-naphthoic acid and the like in the form of the alkali metal or ammonium salt.

The other component (b) contained in the aqueous coating solution used in the inventive method is a polyvinyl alcohol, which, though not particularly limitative, should preferably have such a degree of polymerization that an aqueous solution thereof in a concentration of 4% by weight has a viscosity in the range from 4 to 100 centipoise or, more preferably, from 20 to 100 centipoise at 20° C. as measured according to the Hoppler's method and should have a degree of saponification of at least 70% or, more preferably, at least 80%. Within the above given limits for the characterizing parameters, almost identical results can be obtained.

The aqueous coating solution used in the inventive method is prepared, for example, by first dissolving the component (a) in water in a concentration of 0.01 to 5% by weight and then dissolving the component (b) therein in a suitable concentration followed by the control of the pH value of the solution into 7 or below or, preferably, in the range of 2 to 5 with addition of a small amount of a suitable acid. The amount of the polyvinyl alcohol as the component (b) is preferably in the range from 2 to 40 parts by weight or, more preferably, from 5 to 25 parts by weight per 100 parts by weight of the component (a) whereby the adhesion of the coating layer to the surface of the reactor walls and the like is markedly improved. The addition and dissolution of the component (b), i.e. a polyvinyl alcohol, may be performed at any time in the course of the preparation of the coating solution. For example, the polyvinyl alcohol is dissolved in water in advance prior to the addition of the component (a). Alternatively, addition of the component (b) may follow the addition of the component (a) to water either before or after neutralization or acidification of the solution with an acid. It is of course that the polyvinyl alcohol may be dissolved in the water simultaneously with the component (a) followed by neutralizsation or acidification. It is a convenient way that the polyvinyl alcohol alone is dissolved in water separately to give a master solution having a relatively high concentration and this master solution is used in the above mentioned preparation of the aqueous coating solution.

As is understood from the above description, it is an essential requirement for the aqueous coating solution that the solution is not alkaline or the pH value thereof should be 7 or below in order to obtain a water-insoluble coating layer on the surface of the reactor walls capable of exhibiting excellent effectiveness for the prevention of polymer scale deposition.

The acid used for the neutralization or acidification of the alkaline aqueous solution containing the component (a) is not particularly limitative and selected from inorganic and organic acids exemplified by, for example, sulfuric acid, hydrochloric acid, phosphoric acid, nitric acid, carbonic acid, perchloric acid, molybdic acid, tungstic acid, formic acid, acetic acid, oxalic acid, maleic acid, glycolic acid, lactic acid, thioglycolic acid, phytic acid and the like. These acids are used conveniently as an aqueous solution prepared in advance.

The aqueous coating solution prepared in the above described manner is applied to the reactor walls and the surfaces of other equipments coming into contact with the monomer or monomers followed by thorough drying of the coated surface. Alternatively, the surface to be coated with the coating solution is heated in advance at a temperature of, for example, 40° to 100° C. and the coating solution is applied to the thus heated surface so as to be dried up rapidly. In either case, the coated and dried surface is then washed with water, if necessary.

The solvent in the above mentioned aqueous coating solution is not limited to water alone but it may be a mixture of water and one or more of organic solvents readily miscible with water. When the organic solvent mixed with water has a high volatility, an advantage is obtained that the drying after coating of the reactor walls with the aqueous coating solution can be completed even at room temperature without heating or under mild heating. Such a water-miscible organic solvent is selected from esters, ketones and lower alcohols such as methyl and ethyl alcohols.

It is desirable that the scale preventing effect obtained by coating with the above prepared coating solution is uniform all over the surface of the reactor walls made, for example, of stainless steel. In this respect, the spreadability of the solution on the surface can be improved by adding certain improver agents to the aqueous coating solution. Particularly effective as the improver additive for the spreadability of the solution are the aliphatic monohydric alcohols having from 3 to 6 carbon atoms in a molecule exemplified by n-propyl alcohol, isopropyl alcohol, n-butyl alcohol, isobutyl alcohol, sec-butyl alcohol, tert-butyl alcohol, n-amyl alcohol, tert-amyl alcohol, isoamyl alcohol, sec-amyl alcohol, sec-hexyl alcohol and the like. These alcohols are used either singly or as a combination of two kinds or more in such a concentration that the resultant aqueous coating solution contains from about 1 to about 20% by weight of the alcohols whereby the desired improvement in the spreadability of the solution on the surface can be obtained.

The coating amount of the aqueous coating solution according to the inventive method may be about the same as in the cases of using conventional coating solutions. That is, sufficient effects of polymer scale prevention can be obtained by coating the reactor walls and other surfaces with the above described aqueous coating solution in an amount of at least 0.001 g/m$^2$ as dried.

The method of the present invention is very versatile and sufficient effect of polymer scale prevention can be obtained to about the same degree irrespective of the kind of the vinylic monomer subjected to the polymerization. The vinylic monomers, which can be polymerized without polymer scale deposition according to the inventive method, include vinyl halides such as vinyl chloride and the like, vinyl esters such as vinyl acetate, vinyl propionate and the like, acrylic anc methacrylic acids as well as esters and salts thereof, maleic and fumaric acids as well as esters thereof and maleic anhydride, dienic monomers such as butadiene, chloroprene, isoprene and the like, styrene, acrylonitrile, vinylidene halides, vinyl ethers and the like. These monomers may be polymerized either singly or as a mixture of two kinds or more according to need.

The effectiveness of the inventive method is little affected by the types of the polymerization process and the composition of the polymerization mixture such as the kind and amount of the additive ingredients. For example, the suspension polymerizsation or emulsion polymerization of a vinylic monomer is performed by the addition of a dispersion aid selected from a wide variety of the effective compounds which may be a suspension agent, such as a polyvinyl alcohol, methyl cellulose and the like, an anionic surface active agent such as sodium laurylsulfate, sodium dodecylbenzene sulfonate, sodium dioctyl sulfosuccinate and the like and a non-ionic surface active agent such as sorbitan monolaurate, polyoxyethylene alkyl ethers and the like, and other additives including a filler such as calcium carbonate, titanium dioxide and the like, a stabilizer such as tribasic lead sulfate, calcium stearate, dibutyl tin dilaurate, dioctyltin mercaptide and the like, a lubricant such as rice wax, stearic acid and the like, a plasticizer such as dioctyl phthalate, dibutyl phthalate and the like, a chain transfer agent such as trichloroethylene, mercaptans and the like and a pH controlling agent.

Furthermore, the most advantageous characteristic of the inventive method is that the effect of the polymer scale prevention is little affected by the kind of the polymerization initiator and quite satisfactory results are obtained irrespective of the kind of the polymerization initiator.

The free-radical plymerization of vinylic monomers are usually performed by the use of a peroxide or an organic azo compound as the polymerization initiator as exemplified by lauroyl peroxide, α-cumene hydroperoxide, p-menthane hydroperoxide, 3,5,5-trimethylhexanoyl peroxide, diisopropylperoxy dicarbonate, di-2-ethylhexylperoxy dicarbonate, di-2-ethoxyethylperoxy dicarbonate, bis-3-methoxybutylperoxy dicarbvonate, dibutoxyethylperoxy dicarbonate, tert-butylperoxy pivalate, α-cumylperoxy neodecanoate, acetyl cyclohexyl sulfonyl peroxide, azobisisobutyronitrile, azobis-2,4-dimethyl valeronitrile and the like.

Limiting the subject matter to the polymerizatin of vinyl chloride monomer, suspension polymerization of the monomer is usually carried out by using a monomer-soluble polymerization initiator among the above named ones while each of the initiators has its own advantages and disadvantages. For example, the peroxide initiators having an extremely low solubility in water, such as di-2-ethylhexylperoxy dicarbonate, 3,5,5-trimethylhexanoyl peroxide, α-cumylperoxy neodecanoate and the like, have a problem that the polyvinyl chloride resin product obtained therewith is poor in the heat stability in addition to the susceptibility to the initial coloring in the molding. On the other hand, those peroxide initiators having a relatively large solubility in water, say, of 0.2% by weight or larger at 20° C., such as di-2-ethoxyethylperoxy dicarbonate, bis-3-methoxybutylperoxy dicarbonate, dibutoxyethylperoxy dicarbonate and the like, are advantageous in the above mentioned respects of the properties of the polymer products while the peroxide initiators of such a type are not widely used in the practical polymerization processes of vinyl chloride because the amount of the polymer scale deposition on the reactor walls is considerably larger in the polymerization using these initiators than the other types of the initiators. This problem is readily solved by the inventive method so that polyvinyl chloride resin products of high quality can readily be obtained by the inventive method without suffering the problem of polymer scale deposition.

The method of the present invention is very versatile in its effectiveness and applicable to any types of polymerization processes of vinylic monomers. Particularly remarkable improvements can be obtained in the reduction of polymer scale deposition, however, in the polymerization processes including, for example, the suspension polymerization and emulsion polymerization of vinyl chloride or a monomer mixture, e.g. a mixture of vinyl chloride and vinyl acetate, mainly composed of, say, 50% by weight or more of vinyl chloride as well as preparation of polymer beads or latexes of polystyrene, polymethyl methacrylate, polyacrylonitrile and the like in a polymerization reactor of stainless steel, preparation of latexes of synthetic rubbers such as SBR, NBR, CR, IR, IIR and the like, usually, by emulsion polymerization and preparation of ABS resins.

Following are the examples to illustrate the method of the present invention in further detail.

In the following examples, the aqueous coating solutions were prepared with addition of either one of the polyvinyl alcohols listed in Table 1 below which characterizes the polyvinyl alcohols by the viscosity at 20° C. of the aqueous solution containing 4% by weight of the polyvinyl alcohol and the degree of saponification.

TABLE 1

| Polyvinyl alcohol | Viscosity of aqueous solution, centipoise, at 20° C. | Degree of saponification, % |
|---|---|---|
| PVA-I | 64 | 100 |
| PVA-II | 39 | 100 |
| PVA-III | 27.5 | 100 |
| PVA-IV | 22.5 | 100 |
| PVA-V | 54 | 98 |
| PVA-VI | 27.5 | 98 |
| PVA-VII | 52 | 88 |
| PVA-VIII | 43 | 88 |
| PVA-IX | 48 | 80 |
| PVA-X | 35 | 80 |

EXAMPLE 1

Four coating solutions were prepared each in the formulation given in Table 2 below containing a dye and/or a polyvinyl alcohol without or with adjustment of the pH of the solution by the addition of sulfuric acid.

TABLE 2

| Coating solution | I | II | III | IV |
|---|---|---|---|---|
| Dye | C.I. Solvent Black 7 | — | C.I. Acid Black 2 | C.I. Acid Black 2 |
| Dye concentration, % by weight | 0.5 | — | 0.5 | 0.5 |
| Polyvinyl alcohol | — | PVA-II | — | PVA-II |
| Polyvinyl alcohol concentration, % by weight | — | 0.5 | — | 0.08 |
| Solvent | Methyl alcohol | Water | Water | Water |
| pH | — | Not controlled | 2.5 | 2.5 |

Inner walls of a polymerization reactor of 1000 liter capacity made of stainless steel and the surface of the stirrer coming into contact with the monomer during polymerization were coated with either one of the above prepared coating solutions I to IV in a coating amount of 0.1 g/m² as dried followed by drying with heating at 90° C. for 10 minutes and washing with water.

Into the thus coated polymerization reactor were introduced 500 kg of water containing 150 g of a partially saponified polyvinyl alcohol and 50 g of a methyl cellulose dissolved therein, 250 kg of vinyl chloride monomer and a polymerization initiator of the kind and amount as indicated in Table 4 below and the polymerization reaction was carried out by heating the above polymerization mixture at 50° C. for 10 hours with agitation.

In Experiments No. 1 to No. 28 shown in Table 4, seven kinds of peroxide initiators were used. Table 3 below is a listing of these peroxide initiators with their respective abridgement used in Table 4 and the solubility thereof in water at 20° C. The solubility of the peroxide initiator in water was determined by the procedure in which the peroxide was shaken with water at 20° C. followed by the removal of the undissolved peroxide and iodometric titration of the aqueous solution.

TABLE 3

| Peroxide initiator | Abridgement | Solubility in water at 20° C., % by weight |
|---|---|---|
| Di-2-ethylhexylperoxy dicarbonate | OPP | 0.04 |
| Lauroyl peroxide | LPO | 0.003 |
| 3,5,5-Trimethylhexanoyl peroxide | L-355 | 0.05 |
| α-Cumylperoxy decanoate | L-188 | 0.01 |
| Di-2-ethoxyethylperoxy dicarbonate | EEP | 0.41 |
| Bis-3-methoxybutylperoxy dicarbonate | MPC | 0.24 |
| Dibutoxyethylperoxy dicarbonate | BEP | 0.21 |

After completion of each polymerization run in the above described manner, the aqueous polymerizate slurry was discharged out of the reactor and the amount of the polymer scale deposited on the reactor walls was determined. Further, the polymerizate slurry was processed in the usual manner to give a dried polyvinyl chloride resin product and the quality thereof was evaluated by the determination of the number of fish-eyes and the heat stability according to the procedures given below and the results are shown in Table 4.

Determination of fish-eyes: a resin compound composed of 100 parts by weight of the product resin, 50 parts by weight of dioctyl phthalate, 1 part by weight of dibutyltin dilaurate, 1 part by weight of cetyl alcohol, 0.25 part by weight of titanium dioxide and 0.05 part by weight of carbon black was milled for 7 minutes in a two-roller mill at 150° C. and then shaped into a sheet of 0.2 mm thickness. This sheet was examined under transmitting light and the number of the fish-eyes was counted per 100 cm² area of the sheet.

Determination of heat stability: a resin compound composed of 100 parts by weight of the product resin, 1 part by weight of dibutyltin maleate and 1 part by weight of stearic acid was milled for 10 minutes in a two-roller mill at 170° C. with a roll gap of 0.7 mm and then shaped into a sheet of a thickness of 0.7 mm. This resin sheet was heated in a Geer's oven at 180° C. and time to the blackening of the resin sheet in minutes was taken as a measure of the heat stability of the resin.

As is understood from the formulation of the coating solutions shown in Table 2, the Experiments No. 1 to No. 21 were undertaken for comparative purpose and Experiments No. 22 to No. 28 only were according to the inventive method. As is clear from the results given in Table 4, the amounts of polymer scale deposition widely differ depending on the kind of the polymerization initiator. That is, the amounts of polymer scale deposition were invariably quite large when the polymerization was undertaken by use of EEP, MPC or BEP as the polymerization initiator as shown by the Experiments No. 5 to No. 7, No. 12 to No. 14 and No. 19 to No. 21 according to the conventional process while the polymer scale deposition was substantially completely prevented even by the use of these polymerization initiators when the reactor walls had been coated according to the inventive method as is shown by the results obtained in Experiments No. 26 to No. 28 shown in Table 4.

TABLE 4

| Experiment No. | Coating solution | Polymerization initiator (amount used, g) | | Properties of polymer | | Polymer scale deposition, g/m² |
|---|---|---|---|---|---|---|
| | | | | Heat stability minutes | Fisheyes, pieces/100 cm² | |
| 1 | I | OPP | (100) | 100 | 5 | 1 |
| 2 | | LPO | (500) | 100 | 5 | 2 |
| 3 | | L-355 | (300) | 100 | 5 | 1 |
| 4 | | L-188 | (200) | 100 | 5 | 4 |
| 5 | | EEP | (100) | 130 | 40 | 500 |
| 6 | | MPC | (100) | 130 | 40 | 450 |
| 7 | | BEP | (100) | 130 | 35 | 350 |
| 8 | II | OPP | (100) | 100 | 30 | 200 |
| 9 | | LPO | (500) | 100 | 31 | 250 |
| 10 | | L-355 | (300) | 100 | 30 | 300 |
| 11 | | L-188 | (200) | 100 | 32 | 340 |
| 12 | | EEP | (100) | 130 | 42 | 580 |
| 13 | | MPC | (100) | 130 | 42 | 400 |
| 14 | | BEP | (100) | 130 | 37 | 400 |
| 15 | III | OPP | (100) | 100 | 5 | 0 |
| 16 | | LPO | (500) | 100 | 5 | 2 |
| 17 | | L-355 | (300) | 100 | 5 | 0 |
| 18 | | L-188 | (200) | 100 | 5 | 0 |
| 19 | | EEP | (100) | 130 | 40 | 500 |
| 20 | | MPC | (100) | 130 | 40 | 450 |
| 21 | | BEP | (100) | 130 | 35 | 350 |
| 22 | IV | OPP | (100) | 100 | 5 | 0 |
| 23 | | LPO | (500) | 500 | 5 | 0 |
| 24 | | L-355 | (300) | 300 | 5 | 0 |
| 25 | | L-188 | (200) | 5 | 0 | |
| 26 | | EEP | (100) | 130 | 5 | 8 |
| 27 | | MPC | (100) | 130 | 5 | 5 |
| 28 | | BEP | (100) | 130 | 5 | 7 |

On the other hand, further experiments were undertaken in substantially the same experimental procedures as in Experiments No. 26 to No. 28 except that each of the coating solutions used in these additional experiments was admixed with 10% by weight of isobutyl alcohol to find that the amounts of polymer scale deposition were further decreased with substantial absence of the polymer scale on the reactor walls after completion of the polymerization run.

EXAMPLE 2

Aqueous coating solutions were prepared by dissolving either a polyvinyl alcohol (component (b)) alone or a combination of a polyvinyl alcohol (component (b)) and a dye or an organic sulfonic acid or carboxylic acid type in the form of an alkali metal or ammonium salt (component (a)) in water in a total concentration of the components (a) and (b) of 0.5% by weight followed by the adjustment of the pH value with addition of phosphoric acid to 2.5. The weight ratios of the component (a) to component (b), when used conjunctively, are given in Table 5 below.

Into a polymerization reactor of 100 liter capacity made of stainless steel, having been coated on the inner walls and the surface of the stirrer with either one of the above prepared coating solutions in a coating amount of 0.1 g/m² as dried followed by drying with heating at 90° C. for 10 minutes and washing with water, were introduced 40 kg of water, 17 kg of vinyl chloride monomer, 3 kg of vinyl acetate monomer, 12 g of a partially saponified polyvinyl alcohol, 4 g of a hydroxypropyl methylcellulose, 6 g of bis-3-methoxybutylperoxy dicarbonate as the polymerization initiator and 200 g of trichloroethylene and the polymerization of the monomer mixture was carried out, after preparatory agitation for 15 minutes, by increasing the temperature up to 58° C. and continuing agitation for 12 hours at this temperature. After completion of the polymerization, the polymerizate slurry was discharged out of the reactor and the amount of the polymer scale deposited on the reactor walls was examined to give the results shown in Table 5 below.

EXAMPLE 3

Aqueous coating solutions were prepared by dissolving a dye (component (a)) alone or a combination of a dye (component (a)) and a polyvinyl alcohol (component (b)) in water in a total concentration of 1.0% by weight for the components (a) and (b) followed by the adjustment of the value of pH to 3.0 with addition of phosphoric acid and addition of isobutyl alcohol in a concentration of 10% by weight in the solution. The weight ratio of the component (a) to component (b) in each of the solutions was as indicated in Table 6 below.

Into a polymerization reactor of 500 liter capacity made of stainless steel and equipped with a stirrer, having been coated on the inner walls and the surface of the stirrer with either one of the above prepared coating solutions in a coating amount of 0.1 g/m² as dried followed by drying with heating at 90° C. for 10 minutes and washing with water, were introduced 200 kg of water, 100 kg of styrene monomer, 1 kg of calcium phosphate, 10 g of sodium dodecylbenzenesulfonate, 20 g of a methyl cellulose and 20 g of BEP and the polymerization of the styrene was carried out by heating the polymerization mixture at 60° C. for 5 hours with agitation. After completion of the polymerization, the polymerizate slurry was discharged out of the polymerization reactor and the amount of the polymer scale deposited on the reactor walls was examined to give the results shown in Table 6 below.

TABLE 5

| Experiment No. | Components of coating solution (a) | (b) | Weight ratio of component (a)/component (b) | Polymer scale deposition, g/m² |
|---|---|---|---|---|
| 29 | — | — | — | 1800 |
| 30 | — | PVA-I | 0/100 | 1700 |
| 31 | — | PVA-II | 0/100 | 1700 |
| 32 | — | PVA-III | 0/100 | 1700 |
| 33 | — | PVA-IV | 0/100 | 1800 |
| 34 | — | PVA-V | 0/100 | 1700 |
| 35 | — | PVA-VI | 0/100 | 1700 |
| 36 | — | PVA-VII | 0/100 | 1700 |
| 37 | — | PVA-VIII | 0/100 | 1700 |
| 38 | — | PVA-IV | 0/100 | 1700 |
| 39 | — | PVA-X | 0/100 | 1700 |
| 40 | C.I. Acid Black 2 | — | 100/0 | 1300 |
| 41 | C.I. Acid Black 2 | PVA-II | 100/7 | 0 |
| 42 | C.I. Acid Black 2 | PVA-VII | 100/10 | 0 |
| 43 | C.I. Acid Black 2 | PVA-IX | 100/20 | 2 |
| 44 | C.I. Acid Violet 11 | PVA-V | 100/8 | 1 |
| 45 | Sodium anthraquinonesulfonate | PVA-IX | 100/15 | 3 |
| 46 | C.I. Direct Blue 71 | PVA-III | 100/10 | 1 |
| 47 | C.I. Acid Blue 116 | PVA-V | 100/2 | 1 |
| 48 | C.I. Mordant Black 1 | PVA-X | 100/25 | 5 |
| 49 | C.I. Solubilized Vat Black 1 | PVA-VIII | 100/12 | 4 |
| 50 | C.I. Reactive Blue 2 | PVA-VI | 100/19 | 2 |
| 51 | C.I. Mordant Violet 5 | PVA-X | 100/40 | 6 |
| 52 | Sodium isonicotinate | PVA-I | 100/6 | 8 |
| 53 | C.I. Direct Blue 106 | PVA-IX | 100/10 | 3 |
| 54 | C.I. Direct Black 38 | PVA-II | 100/4 | 1 |
| 55 | C.I. Mordant Black 5 | PVA-I | 100/2 | 2 |
| 56 | C.I. Azoic Brown 2 | PVA-IX | 100/30 | 5 |
| 57 | C.I. Acid Blue 158 | PVA-VIII | 100/15 | 2 |

TABLE 6

| Experiment No. | Components of coating solution (a) | (b) | Weight ratio of component (a)/component (b) | Polymer scale deposition, g/m² |
|---|---|---|---|---|
| 58 | — | — | — | 280 |
| 59 | C.I. Acid Black 2 | — | — | 180 |
| 60 | C.I. Acid Black 2 | PVA-II | 100/11 | 5 |
| 61 | C.I. Acid Black 2 | PVA-VIII | 100/18 | 3 |
| 62 | C.I. Acid Black 2 | PVA-IX | 100/20 | 10 |
| 63 | C.I. Acid Black 2 | PVA-VIII | 100/15 | 3 |
| 64 | C.I. Acid Blue 158 | PVA-I | 100/7 | 5 |
| 65 | C.I. Acid Blue 158 | PVA-V | 100/8 | 7 |
| 66 | C.I. Acid Blue 158 | PVA-IX | 100/15 | 6 |
| 67 | C.I. Acid Blue 158 | PVA-VIII | 100/20 | 12 |
| 68 | C.I. Acid Blue 158 | PVA VI | 100/25 | 20 |

What is claimed is:

1. A method, in the polymerization of a vinylic monomer in a polymerization reactor, in which the polymerization initiator is an organic peroxide which is soluble in the monomer but has a solubility in water of 0.2% by weight or larger at 20 degrees C., for preventing deposition of polymer scale on the surface of the reactor walls which method comprises (A) coating the surface of the reactor walls, prior to the introduction of the polymerization mixture into the polymerization reactor, with an aqueous coating solution having a pH of 7 or below and containing
      (a) an alkali metal or ammonium salt of a sulfonic acid or carboxylic acid dye or an alkali metal or ammonium salt of an organic sulfonic acid or carboxylic acid having at least one pair of conjugated double bonds in a molecule, and
      (b) a polyvinyl alcohol dissolved therein, and
   (B) drying the thus coated surface.

2. The method as claimed in claim 1 wherein the alkali metal or ammonium salt of a sulfonic acid or carboxylic acid dye is selected from the group consisting of C.I. Direct Yellow 1, C.I. Acid Yellow 38, C.I. Acid Yellow 3, C.I. Reactive Yellow 3, C.I. Direct Orange 2, C.I. Direct Orange 10, C.I. Direct Red 18, C.I. Acid Red 52, C.I. Acid Red 73, C.I. Direct Red 186, C.I. Direct Red 92, C.I. Direct Violet 1, C.I. Direct Violet 22, C.I. Acid Red 18, C.I. Acid Violet 11, C.I. Acid Violet 78, C.I. Mordant Violet 5, C.I. Direct Blue 6, C.I. Direct Blue 71, C.I. Direct Blue 106, C.I. Reactive Blue 2, C.I. Reactive Blue 18, C.I. Acid Blue 116, C.I. Acid Blue 158, C.I. Mordant Blue 1, C.I. Mordant Black 1, C.I. Mordant Black 5, C.I. Acid Black 2, C.I. Direct Black 38, C.I. Solubilized Vat Black 1, C.I. Fluorescent Brightening Agent 30, C.I. Fluorescent Brightening Agent 32 and C.I. Azoic Brown 2.

3. The method as claimed in claim 1 wherein the organic sulfonic acid or carboxylic acid having at least one pair of conjugated double bonds in a molecule is selected from the group consisting of 1-naphthalene sulfonic acid, anthraquinone sulfonic acid, dodecylbenzene sulfonic acid, p-toluene sulfonic acid, abietic acid, isonicotinic acid, benzoic acid, phenyl glycine and 3-hydoxy-2-naphthoic acid.

4. The method as claimed in claim 1 wherein the polyvinyl alcohol has such a degree of polymerization that an aqueous solution thereof in a concentration of 4% by weight has a viscosity in the range from 4 to 100 centipoise at 20° C. as measured according to the Hoppler's method and has a degree of saponification of at least 70%.

5. The method as claimed in claim 1 wherein the aqueous coating solution contains from 2 to 40 parts by weight of the component (b) per 100 parts by weight of the component (a).

6. The method as claimed in claim 1 wherein the aqueous coating solution further contains an aliphatic monohydric alcohol having from 3 to 6 carbon atoms in a molecule in a concentration not exceeding 20% by weight.

7. The method as claimed in claim 1 wherein the coating amount with the aqueous coating solution on the surface of the reactor walls is at least 0.001 g/m$^2$ as dried.

* * * * *